US005416967A

United States Patent [19]

Cress

[11] Patent Number: 5,416,967

[45] Date of Patent: May 23, 1995

[54] METHOD OF FORMING A VACUUM FURNACE HAVING HEAT TRANSFER ARRESTING MEANS

[76] Inventor: Steven B. Cress, 31 Lakefront Dr. - Box 30, Glenbrook, Nev. 89413

[21] Appl. No.: 121,179

[22] Filed: Sep. 14, 1993

Related U.S. Application Data

[62] Division of Ser. No. 844,469, Mar. 2, 1992, Pat. No. 5,256,061.

[51] Int. Cl.[6] .......... B23P 11/00

[52] U.S. Cl. .......... 29/436; 29/455.1; 373/112; 432/205

[58] Field of Search .......... 432/205; 373/112, 141; 29/434, 436, 455.1, 890.036, 890.045, 890.046

[56] References Cited

U.S. PATENT DOCUMENTS

| | | | |
|---|---|---|---|
| 1,118,820 | 11/1914 | Simpson | 432/205 |
| 2,678,958 | 5/1954 | Hintenberger | 373/112 |
| 3,226,467 | 12/1965 | Kienel et al. | 373/112 |
| 3,350,495 | 10/1967 | Barnes et al. | 373/112 |
| 3,439,407 | 4/1969 | Rhoads et al. | 29/455.1 |
| 4,427,378 | 1/1984 | Bowers | 432/242 |
| 5,119,395 | 6/1992 | Hemsath et al. | 373/112 |
| 5,193,998 | 3/1993 | Hack et al. | 432/205 |

*Primary Examiner*—Mark Rosenbaum
*Assistant Examiner*—David P. Bryant
*Attorney, Agent, or Firm*—Herbert C. Schulze

[57] ABSTRACT

A method and apparatus for providing an economical vacuum furnace for heat treating of heat treatable articles including: A vacuum furnace heat treating chamber having reduced thickness at its ends in order to arrest heat transfer at seals at the ends of the chamber; and Heating apparatus exterior of the heat treating chamber for heating the interior of the chamber.

7 Claims, 5 Drawing Sheets

FIG. 1.
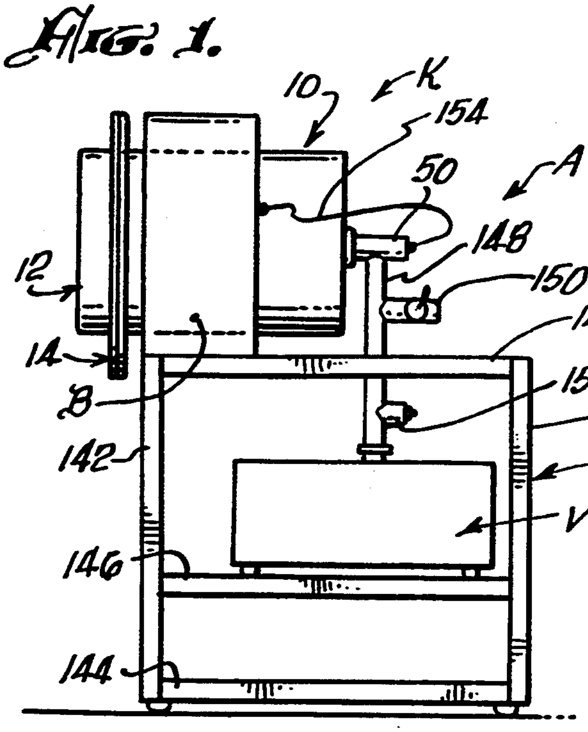
FIG. 2.
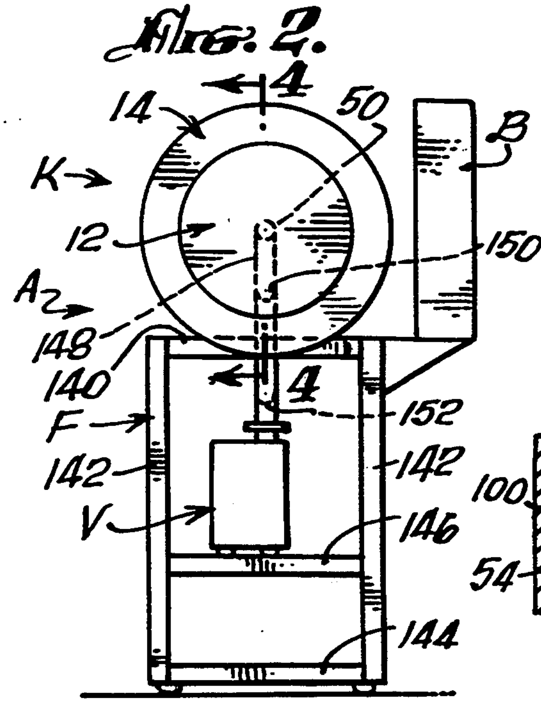
FIG. 6.
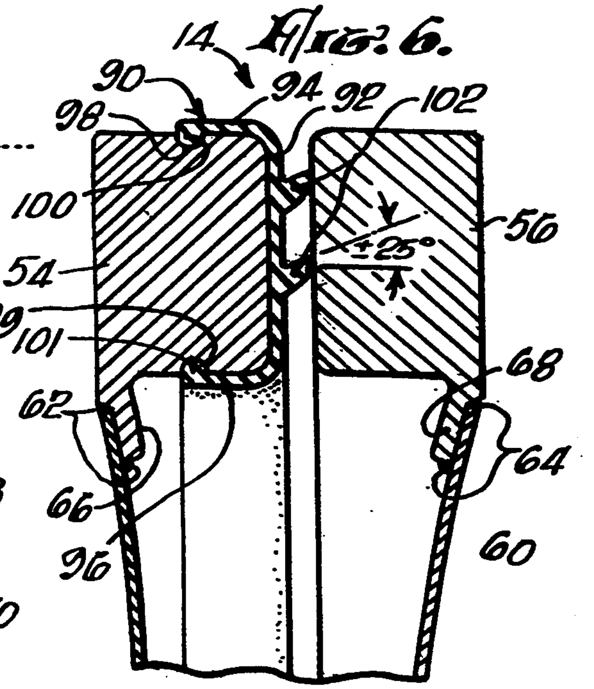
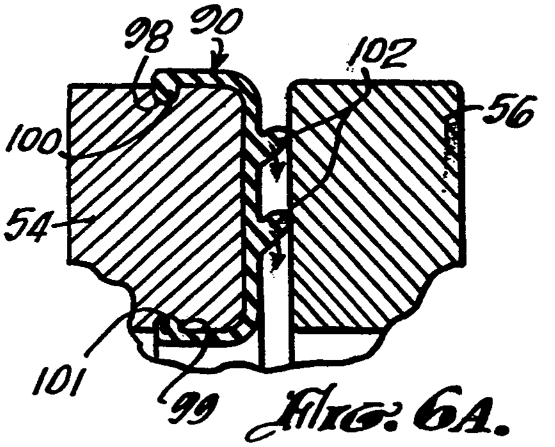
FIG. 6A.

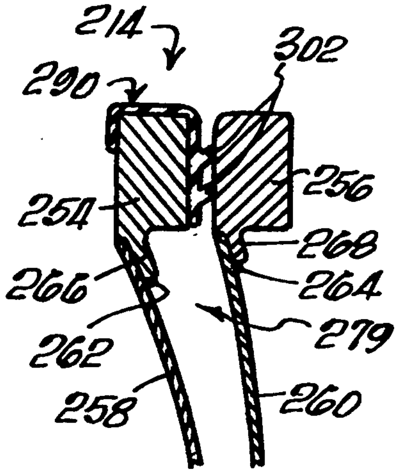
FIG. 8.
FIG. 3.
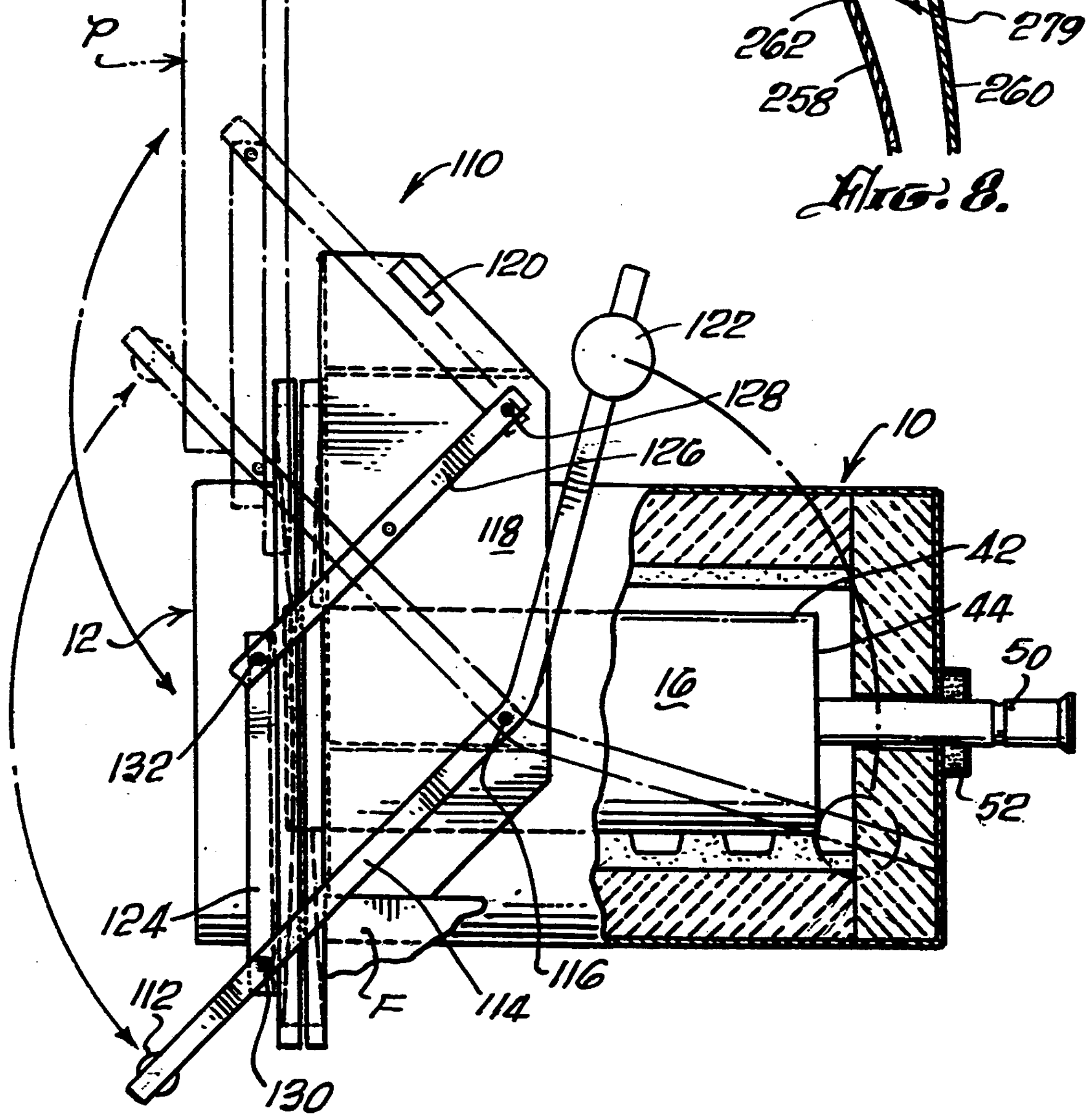

FIG. 5.
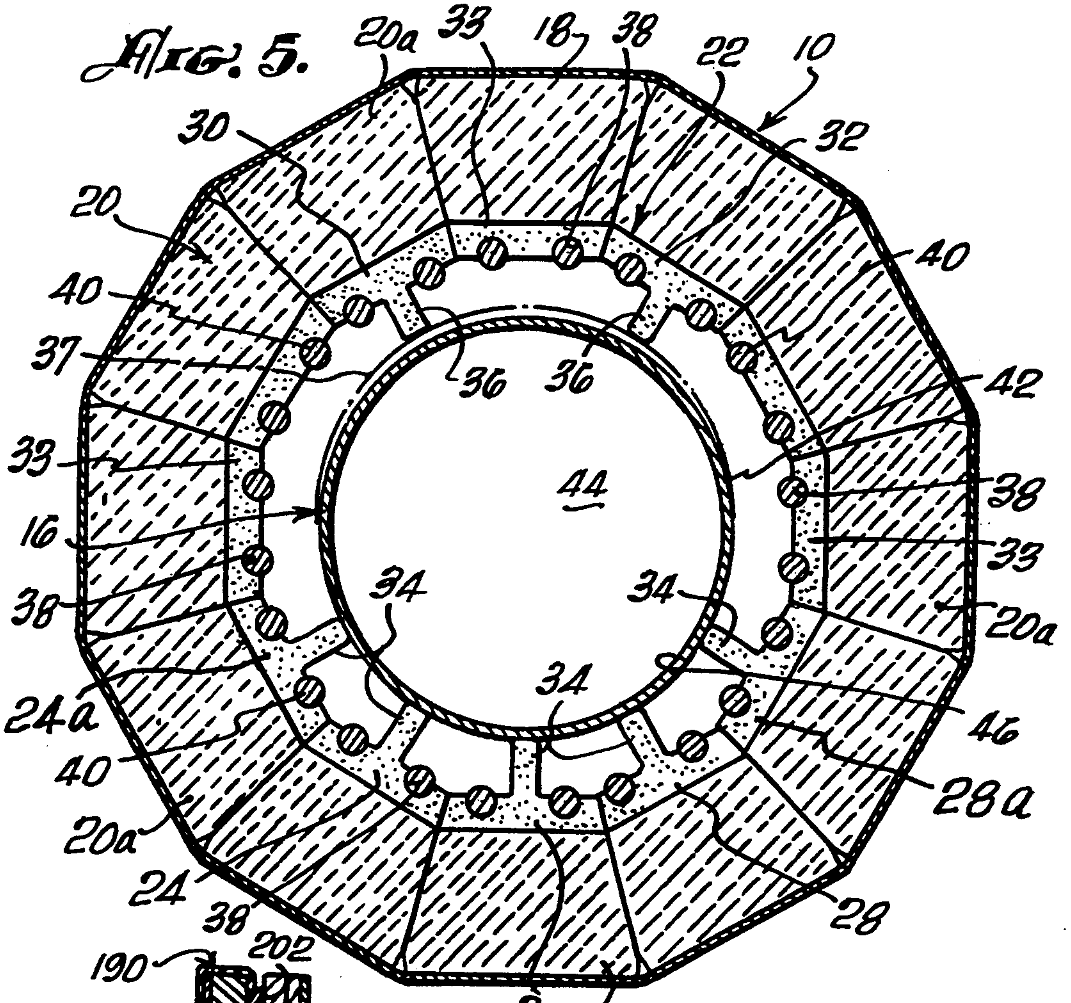
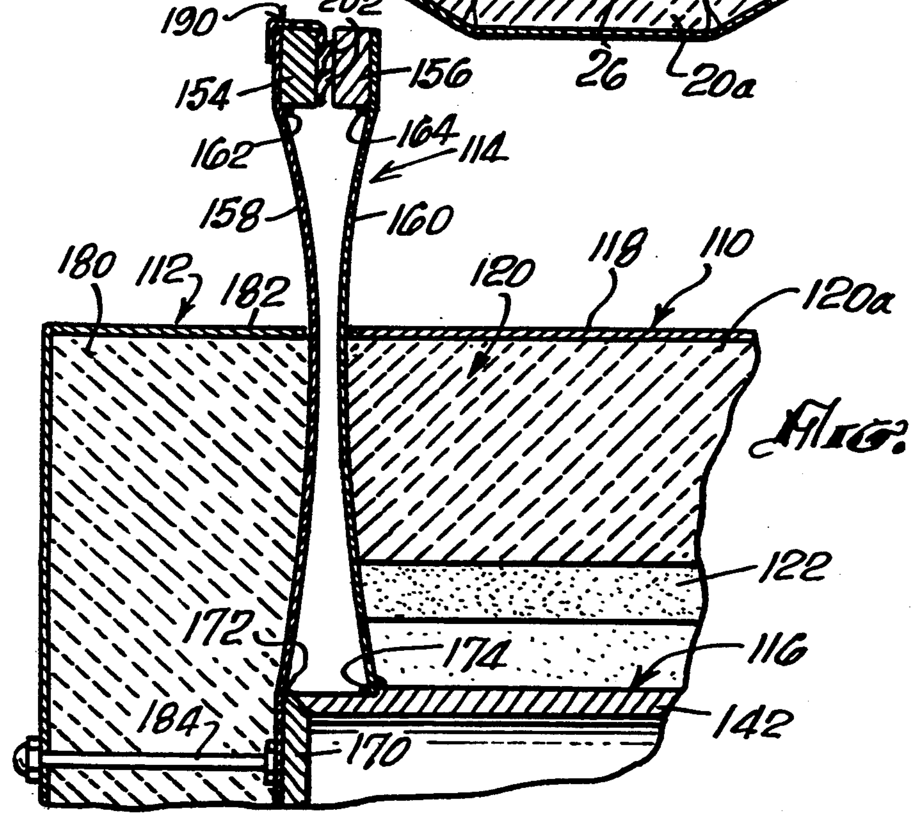
FIG. 7.

METHOD OF FORMING A VACUUM FURNACE HAVING HEAT TRANSFER ARRESTING MEANS

CROSS REFERENCE TO RELATED PATENT APPLICATIONS

This application is related to, and is a divisional application, based upon my presently application Ser. No. 07/844,469, filed Mar. 2, 1992, now U.S. Pat. No. 5,256,061.

BACKGROUND OF THE INVENTION

I. Field of the Invention

This invention is in the general field of furnaces;

The invention is more directly related to furnaces for heat treating;

The invention is even more directly related to such a furnace which is equipped with a vacuum chamber wherein a desired vacuum may be created; and The invention is most particularly directed to such a furnace wherein special door sealing arrangements and heat transfer arresting means are provided to enable a vacuum seal to be held at the door while the entire unit undergoes expansion and contraction because of temperature differentials created in the process. This assists in maintaining uniform temperature within the vacuum chamber.

II. Description of the Prior Art

I am familiar with many types of furnaces used in heat treating and other fields. I am familiar with attempts that have been made to provide economical heat treating furnaces.

I know of no prior art which utilizes a vacuum chamber having a self sealing expansion and contraction door sealing arrangement and heat transfer arresting means such as is described in this specification. In this respect, there is no prior art known to me.

SUMMARY OF THE INVENTION

In the heat treating of metallic articles and the like, many different types of furnaces have been used in the past. In general, a question of economy determines what a particular facility may use and what it may not use.

It is most desirable to use vacuum furnaces for heat treating of articles. However, vacuum furnaces are extremely expensive and generally not suitable for the medium or small machine shop and the like. The overall capital expenditure is prohibitive.

I have studied this problem at length and have now conceived and developed an economical vacuum furnace which can be used by smaller or medium sized machine shops and the like.

Major innovations in my new vacuum furnace include primarily, but not exclusively, an economical self-sealing door and extremely efficient heat transfer arresting means through the vacuum arrangement. My advance in the heat transfer arresting means through the vacuum exhaust is an extremely important advance.

Customarily, heating is within the vacuum chamber. This requires expensive heating elements as is known to those skilled in the art. However, my method and apparatus as disclosed in this application provides an economical means for heating outside of the actual vacuum chamber, utilizing inexpensive heating elements.

With the use of the inventions disclosed herein, harmful gases are kept from Coming in contact with articles being treated, thus providing an environmentally clean atmosphere resulting in enhanced quality and quality control.

Another very interesting, unique and important advance in the field of vacuum sealing has been achieved through the use of angularly disposed flexible members which press against a hard sealing surface.

It is an object of this invention to provide an economical vacuum furnace for use in heat treating articles;

Another object of this invention is to provide a self-sealing door arrangement for such a furnace in which economical sealing arrangements are made;

A further object of this invention is to provide a new and efficient means for heat transfer arrest from a vacuum furnace;

Another object of this invention is to provide a vacuum furnace wherein the heating is exterior of the vacuum chamber;

Another object of this invention is to provide an environmentally clean atmosphere for article being heat treated;

Still another object is to provide a unique vacuum sealing method;

The foregoing and other objects and advantages of this invention will become apparent to those skilled in the art upon reading the description of a preferred embodiment in conjunction with a review of the appended drawings.

BRIEF DESCRIPTION OF THE DRAWINGS

FIG. 1 is a simplified, schematic, side elevation of a vacuum furnace suitable to practice the method of this invention;

FIG. 2 is a front elevation of FIG. 1;

FIG. 3 is a fragmentary side elevation, partially sectioned, showing elements, enlarged, of an apparatus of FIGS. 1 and 2 in more detail, and illustrating an apparatus for door actuation;

FIG. 5 is a section on 5—5 of FIG. 4;

FIG. 6 is an enlarged, fragmentary, sectioned view of the portion of FIG. 4 encircled at location "FIG. 6";

FIG. 6A is an enlarged fragmentary view of a portion of FIG. 6, showing the action of the sealing rings under vacuum;

FIG. 7 is an enlarged, fragmentary, sectioned view of a first alternative embodiment of the door seal arrangement embodied in this invention;

FIG. 8 is a second alternative embodiment of a door seal to practice the method of this invention.

DESCRIPTION OF A PREFERRED EMBODIMENT

Figure 4:
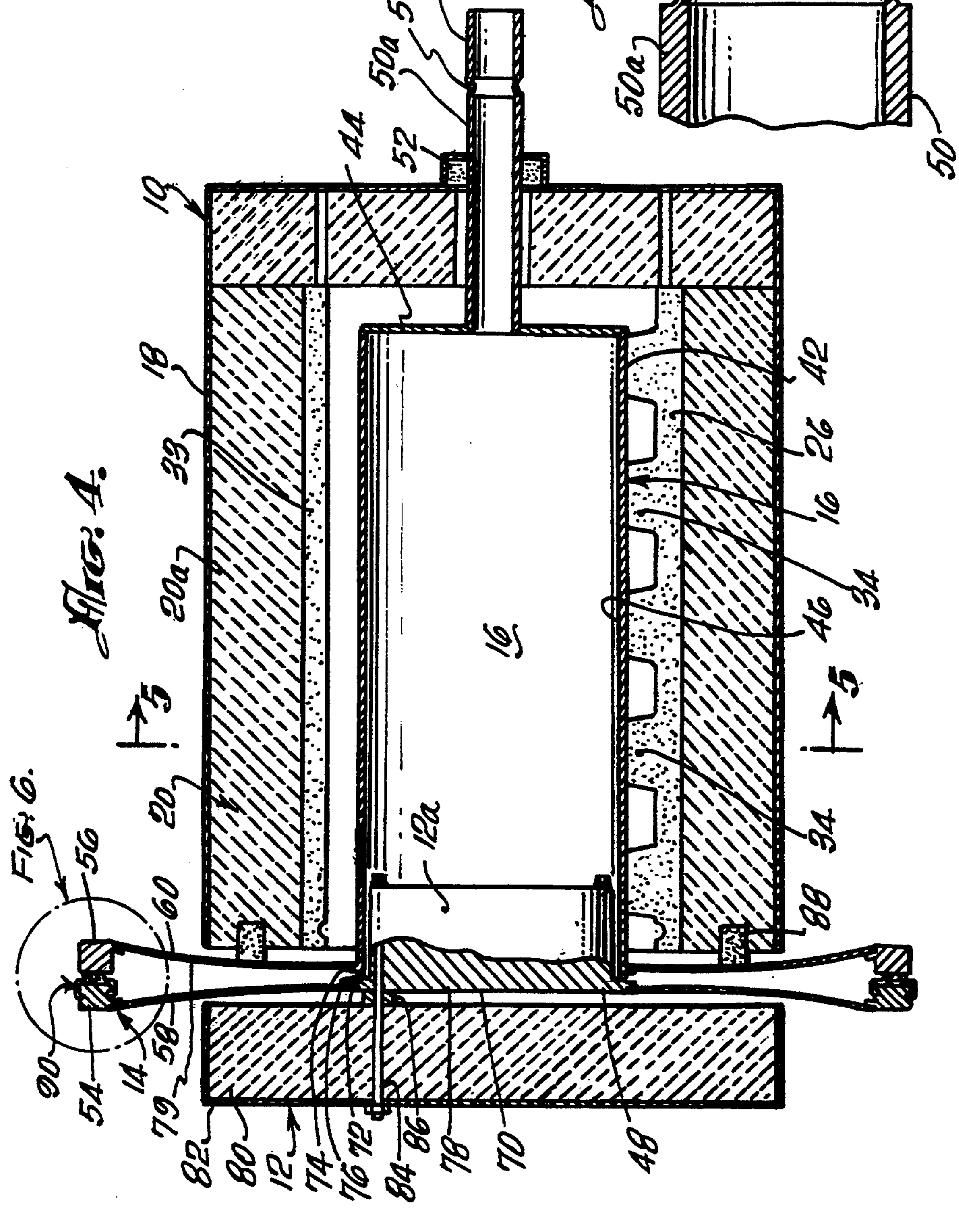
FIG. 4 is an enlarged cross section, in detail, of the vacuum furnace as viewed along 4—4 of the simplified schematic drawing of FIG. 2.
Figure 4A:
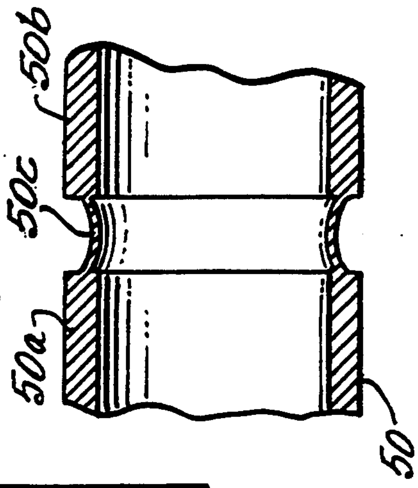
FIG. 4A is an enlarged fragmentary view of an heat transfer arrest portion of the exhaust conduit of FIG. 4.

The vacuum furnace assembly is shown in FIG. 1 by the reference numeral A as it is mounted onto a frame structure F. The kiln portion of the vacuum furnace is indicated at K and is supplemented by a vacuum pump V and an instrument box B.

The views in FIG. 1 and 2 are simplified in order to locate the various components and their relationship to one another.

Referring specifically to FIGS. 4, 5 and 6, it can be seen that the vacuum furnace comprises a main body portion referred to by the reference numeral 10, a door assembly 12 and a seal assembly 14. Heat treating chamber 16 is shown encased within the main body 10.

The main body 10 is constructed with an outer shell 18, preferably made from stainless steel, and a mass of firebrick members 20. The mass of firebrick comprises a series of elongated segments 20*a* arranged in the manner shown best in FIG. 5.

A plurality of ceramic element plates and chamber support members are shown as a group by the reference numeral 22 and are shown as a set of lower ceramic segments 24, 26, 24*a*, 28*a*, and 28 which support the heat treating chamber 16 inside the main body 10. At the upper end of the group of ceramic support members are located a pair of locating segments 30 and 32. Completing the assembly 22 are a series of segments 33.

The lower ceramic segments 24, 26 and 28 are provided with a number of projections 34 arranged in the order as seen in FIG. 4. These projections are of a height necessary to center the heat treating chamber 16 generally in the center of the main body 10. The projections 36 on the upper members 30 and 32 are basically similar to the lower projections except that they are slightly shorter in height in order to allow for the enlargement of the chamber 16 during the heating process. This enlarged condition of the heat treating chamber is shown by the phantom line 37.

Each of the ceramic segments which has been described is provided with elongated grooves 38 for the positioning of a plurality of metallic heating elements 40. Such heating elements are well known in the art and need not be described any further in this application, except that in the case of this invention inexpensive elements, protected by aluminum oxide coating are used. Such cannot be used in the customary vacuum furnaces having the elements within the heat treating chamber as heretofore known. In the prior heat treating furnaces, this results in high maintenance cost.

The heat treating chamber is constructed with a tubular cylindrical wall 42 and an end wall 44 forming a chamber 46 into which the items to be processed are placed. The end opposite the end wall 44 is open at 48. A conduit 50 in the end wall 44 serves as the means of permitting the atmosphere within the chamber 16 to be withdrawn by vacuum when desired. A seal is shown at 52 to keep the heat from within the body 10 from traveling to the atmosphere.

Directing attention now to the seal assembly 14 located between the body 10 and door closure 12, it can be seen that a door portion of the seal has an annular ring 54. A similar ring member is constructed to be attached to the chamber 16.

Attached to the ring 54 is a circular stainless plate 58 and similarly attached to ring 56 is a plate 60.

Shown most clearly in FIGS. 4 and 6 it can be seen that by means of weldments 62 and 64 the plates 58 and 60 are attached to flanges 66 and 68, respectively, of rings 54 and 56.

At its inner end, that is, the end nearest the center of the chamber 16, the plate 58 of the door is affixed to a circular door plate 70. This is accomplished by weldment 72 to a flange 76 of plate 70. The plate 60 is affixed by weldment 74 to a flange 78 on the wall 42 of chamber 16.

The space 79 is thereby formed in the area between the door plate 58 and the chamber plate 60 which becomes a vital feature in the method and apparatus of this invention.

The door 12 is provided with firebrick, or the like, 80 encased in a skin of stainless steel 82. Bolts 84 attach the plate 70 to the door with the aid of spacers 86. To eliminate possible heat loss between the chamber 16 and the plate 60 a packing gland 88 formed from rock wool, or the like, is provided as shown.

An important optional element is shown at 12*a* in FIG. 4. This may, or may not be used. The item is a plug of appropriate insulating material. If used, it further materially reduces heat transfer to the door and sealing elements.

To insure a positive seal between the rings 54 and 56 as is illustrated in more detail in FIG. 6, a resilient seal is provided at 90. This seal has a wall portion 92 vertically oriented and horizontally oriented portions 94 and 96. A pair of outer and inner annular grooves 98 and 99 are formed in the ring member 54 and provide seats for beaded projections 100 and 101 on the horizontal walls 94 and 96 of the seal 90. A pair of annular rings 102 are formed on the vertical wall 92 of the seal which provide contact means against ring 56.

It is to be particularly noted that in the vacuum sealing arrangement the annular rings 102 are angled slightly toward the outer circumference of the rings and are of heavier material at their inner bases than at their exterior where they bear on the ring 56. This results in a unique new vacuum seal, wherein the greater the vacuum, the more the pressure from the exterior deforms the rings 102 and insure sealing. During the forming of a vacuum in the area 46 of the curing chamber, the annular rings 102 are deformed slightly inwardly toward the center of the chamber, but still maintain positive contact against the ring 56. Under extreme pressure rings 102 may even bulge somewhat as shown in FIG. 6A.

Also, the walls 58 and 60 can bow inwardly toward each other during the heating of the whole assembly under vacuum conditions without any danger of vacuum loss between the door and the chamber. As the chamber 16 heats up, it expands toward the door. This expansion is compensated for by the bowing action of plate 60 and thus still does not cause any damage to the door structure.

Referring again to FIG. 3, in particular, it is observed that the opening and closing of the door 12 is easily accomplished by a linkage assembly 110. While I have shown this as one method of accomplishing this purpose, it is obvious to those familiar in the art that any number of methods can be used.

A handle 112 is connected to a pair of arms 114 (the parts that are shown in FIG. 3 are duplicated on the opposite side of the door and body) and pivoted at 116 to a portion of a frame 118.

The movement of the arm is limited at its uppermost position by a stop member 120 mounted on the same frame member 118. A counterweight 122 offsets the weight of the door during the operation. A bracket mounted on the door is seen at 124. A second arm 126 parallel to the lower portion of arm 114 is shown pivoted at 128 to the frame member 118. Both arms 114 and 126 are pivoted at 130 and 132, respectively, to the bracket 124.

An operator, therefore, can move the handle 112 to an upper position as shown by the phantom lines to an open position P and service the chamber portion of the vacuum furnace.

The simplified showing of the apparatus in FIGS. 1 and 2 shows the top platform 140 of the frame F as being mounted on vertical leg structures 142. A lower shelf 144 is provided to be used in the manufacturing procedures and an intermediate platform is shown supporting the vacuum pump.

The conduit 50 from the heat treating chamber is shown connected to a vertical pipe 148 to which is connected a backfill valve extension 150. A popoff 152 is also provided. Control elements in the instrument box B also include a thermocouple element 154.

In the first alternate embodiment shown in FIG. 7 a furnace body 110, door 112 and seal assembly 114 are generally similar to those of the preferred embodiment described earlier in this application. The heat treating chamber 116 with its chamber wall 142, ceramic elements 122, fire brick 120 are shown along with segments **120*a*.**

The seal assembly 114 includes door ring 154 and chamber ring 156. Outer and inner plates 158 and 160 and their respective weldments 162 and 164 are also indicated.

In this arrangement, however, the door seal member 190 is provided with annular ribs 202, and the member 190 is shown configured to fit over the ring 154 in the same manner shown.

Weldments 172 and 174 affix the plates 158 and 160 to the door plate 170 and the heat treating chamber wall 142, respectively. Again, bolt 184 holds the plate 170 to the door assembly 112 which has outer skin 182 encompassing the fire brick 180.

The second alternate embodiment shown in FIG. 8 illustrates a door seal 214 similar to that of FIG. 7 with seal member 290. The seal member has the ribs 302 between door ring 254 and chamber ring 256. The door plate 258, having curvature as shown is welded at 262 to flange 266. The chamber plate 26, affixed at 264 to flange 268 is curved similarly to plate 258. Space 279 still performs the same function that previous embodiments did.

In the illustration of the enlarged fragmentary section FIG. **4*a* the reference numeral 50 indicates a reduced cross-section of the pipe. Excessive heat transfer from the exhaust pipe portion of the chamber is interrupted and arrested when it reaches thin wall section 50*c*. Heat traveling along the inner exhaust 50*a* is arrested and the heat transmitted to the exhaust section 50*b* of the pipe is diminished. The portion 50*b* shrinks with reference to the section 50*a* and 50*c*, 50*c*** the diminished thickness portion, becomes in tension. While one heat arresting section is illustrated, there can be a series of such sections which will continue to substantially arrest the heat transfer along the exhaust conduit.

Figure 9:
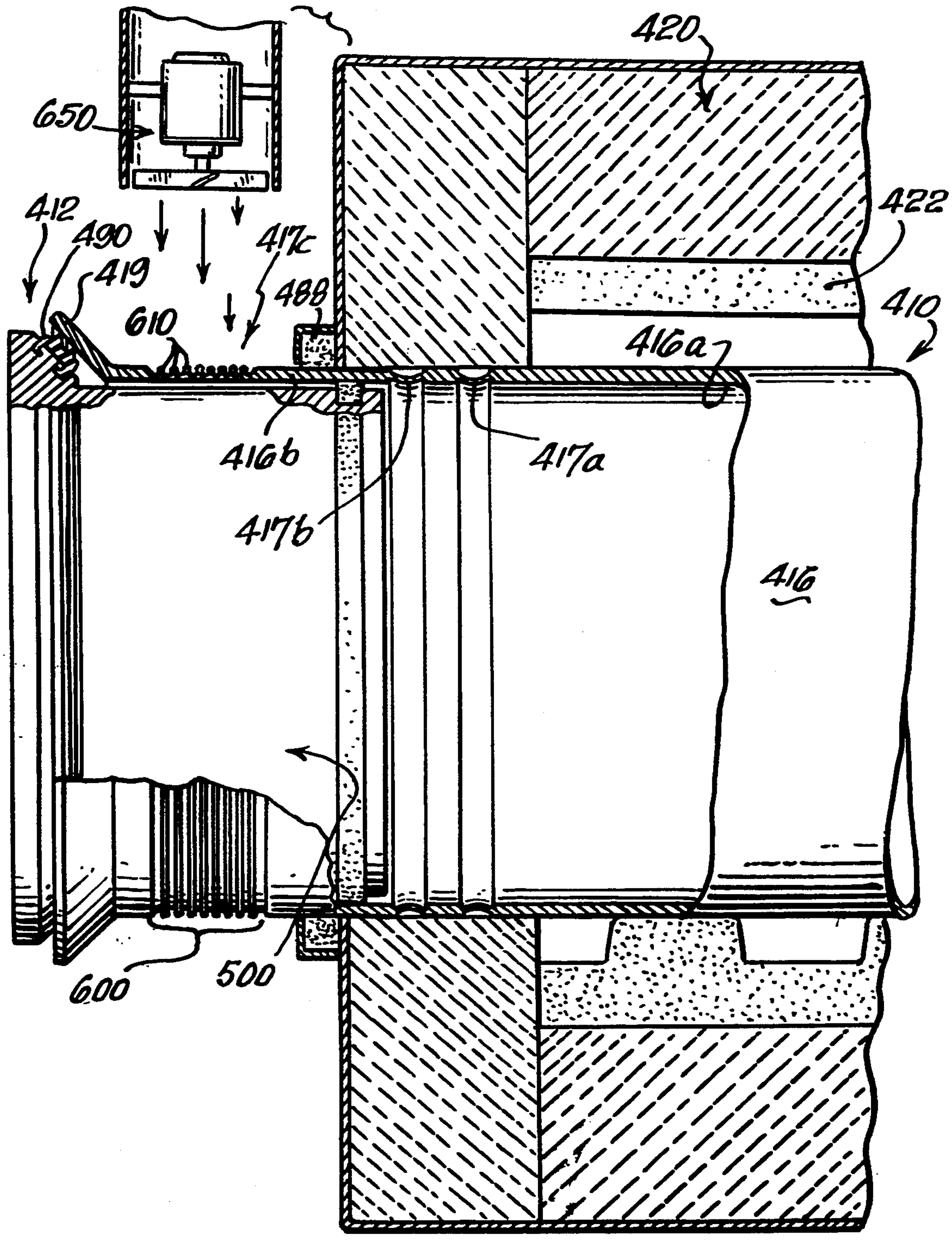
FIG. 9 is an enlarged fragmentary portion of an alternate embodiment of a method of arresting excessive heat transfer from the main heating chamber to the access door seals of the vacuum furnace of the invention.

FIG. 9 shows an extremely important alternate embodiment of the vacuum furnace 410 with its door assembly 412 in enlarged section. The insulated wall 420 of ceramic material, or the like, is covered by a suitable skin 422.

The heating chamber 416 with its inner wall **416*a* is shown to have a plurality of reduced thickness wall portions at 417*a* and 417*b*. Heat traveling along this wall toward the door is substantially arrested and reduced by means of the areas of reduced wall thickness shown at 417*a* and 417*b*. There can be any reasonable number of areas of these reduced wall thickness areas which will substantially reduce the temperature at the seal areas 488 and 490. This temperature reduction at the outer portion 416*b* and at the seals and door 412, 490, and 419** allows for inexpensive and fully effective sealing. This method of reducing the temperature to the exterior results in great economy, resulting in drastic price reduction for a vacuum furnace, without disturbing heat uniformity in the chamber.

At the area shown bracketed at 600, there are shown to be a series of vane like elements machined into the outer surface. This is an optional additional cooling area. Blower 650 will blow air over the general area **417*c* thus further cooling the vanes 610 to a maximum diminished temperature at the sealing area 412**.

In the embodiment shown in FIG. 9, the element 500 is an insulating plug fastened to the door 412. While this embodiment could be operated without that plug, the effect of the plug is to greatly further reduce the temperature of the door and especially at the door seal. This further allows for controlled exhausting of the nitrogen which is used to backfill after completion of the vacuum heat treatment and also during the sealing when the backfill has taken place. The control is as to both in the sealing and in the venting at the completion.

The thin curved plates in the embodiments using that seal arrangement result in temperature uniformity and keep the transfer of heat to the seals at a minimum. Also, the strength is excellent since this has the effect of putting the plates 58 and 60 in tension. There is the added safety feature that the rings can safely open in case of a condition causing back pressure. This is particularly true with angled orientation and structure of the actual sealing rings.

The thin curved plates allow for the excellent results in the seal since if they were not curved they would tend to buckle under the temperature differential between areas 54–56 and 74–76.

While some efforts have been made in the past to use a heavy curved plate for a door, all of these efforts have been with a convex (with relation to the chamber) plate, totally outside the insulation. Such a plate being in compression must be extremely heavy. On the other hand, in the present invention, the thin curved, concave (with respect to the chamber) plates are in tension giving excellent strength characteristics and achieving the results desired.

Although not mentioned in complete detail, it is understood that vacuum will be drawn in the heat treating chamber, the temperature within the chamber will be regulated, and customary controls and arrangements will be made through the vacuum and heating to accomplish the heat treating desired. Such matters are known to those skilled in the art.

While the embodiments of this invention shown and described are fully capable of achieving the objects and advantages desired, it is to be understood that such embodiments are for the purpose of illustration only and not for the purposes of limitation.

I claim:

1. A method of forming a vacuum furnace comprising: forming an elongated tubular chamber with an open end and a partially closed end; forming heat transfer arresting means on said elongated tubular chamber adjacent said open end; affixing a vacuum conduit to said partially closed end of said elongated chamber; forming at least one heat transfer arresting annular ring upon said vacuum conduit;

providing a furnace with an insulated outer wall and an inner chamber sized to accommodate said elongated tubular chamber;

placing said elongated tubular chamber into said inner chamber of said furnace such that the said vacuum conduit extends through said insulated outer wall; and attaching a door to said furnace, said door being moveable between open and closed positions and including sealing means which effectively seal said open end of said elongated tubular chamber when said door is in said closed position.

2. The method of claim 1, further comprising: attaching a first extended annular flanged member to said open end of said elongated tubular chamber; and attaching a second extended annular flanged member to said door; wherein said sealing means are attached to one of said first and second members and are disposed between said first and second members.

3. The method of claim 1, wherein each heat transfer arresting annular ring comprises an annular diminished thickness portion of said vacuum conduit.

4. The method of claim 3, further comprising: attaching a first extended annular flanged member to said open end of said elongated tubular chamber; and attaching a second extended annular flanged member to said door; wherein said sealing means are attached to one of said first and second members and are disposed between said first and second members.

5. The method of claim 1, wherein said heat transfer arresting means comprise at least one reduced thickness portion of said elongated tubular chamber.

6. The method of claim 5, further comprising: attaching a first extended annular flanged member to said open end of said elongated tubular chamber; and attaching a second extended annular flanged member to said door; wherein said sealing means are attached to one of said first and second members and are disposed between said first and second members.

7. The method of claim 6, wherein said heat transfer arresting means comprise a series of reduced thickness portions of said elongated tubular chamber.

* * * * *